United States Patent [19]

Campbell et al.

[11] 3,939,104

[45] Feb. 17, 1976

[54] CATALYTIC PROCESS

[75] Inventors: John Stewart Campbell; Keith Farmery; David John Heath; Norman Henry Harbord, all of Stockton-on-Tees, England

[73] Assignee: Imperial Chemical Industries Limited, London, England

[22] Filed: Oct. 2, 1973

[21] Appl. No.: 402,779

[30] Foreign Application Priority Data

Oct. 4, 1972 United Kingdom............... 45696/72
Nov. 20, 1972 United Kingdom............... 53493/72
Apr. 5, 1973 United Kingdom............... 16288/73

[52] U.S. Cl............ 252/455 R; 252/457; 423/213.5
[51] Int. Cl.$^2$...................... B01J 29/06; B01J 29/00
[58] Field of Search......................... 252/455 R, 457

[56] References Cited
UNITED STATES PATENTS

| 3,256,207 | 6/1966 | Arnold............................ 252/455 R |
| 3,535,228 | 10/1970 | Csicsery et al............... 252/455 R X |
| 3,716,475 | 2/1973 | Csicsery et al............... 252/455 R X |
| 3,803,026 | 4/1974 | Jaffe............................ 252/455 R X |

Primary Examiner—Paul F. Shaver
Attorney, Agent, or Firm—Cushman, Darby & Cushman

[57] ABSTRACT

In a supported catalyst for treating internal combustion engine exhaust gases the active material comprises a non-noble metal or compound thereof and the support comprises a primary support carrying a secondary support; the secondary support consists essentially of one or more involatile acidic and/or amphoteric oxides substantially in combination with one or more basic oxides from Group II, III or IV of the Periodic Table. A platinum group metal may also be present. The catalyst can be used for reductive or oxidative treatment or for simultaneous reduction of nitrogen oxides and oxidation of carbon monoxide and hydrocarbons and exhibits high activity and long life.

18 Claims, 1 Drawing Figure

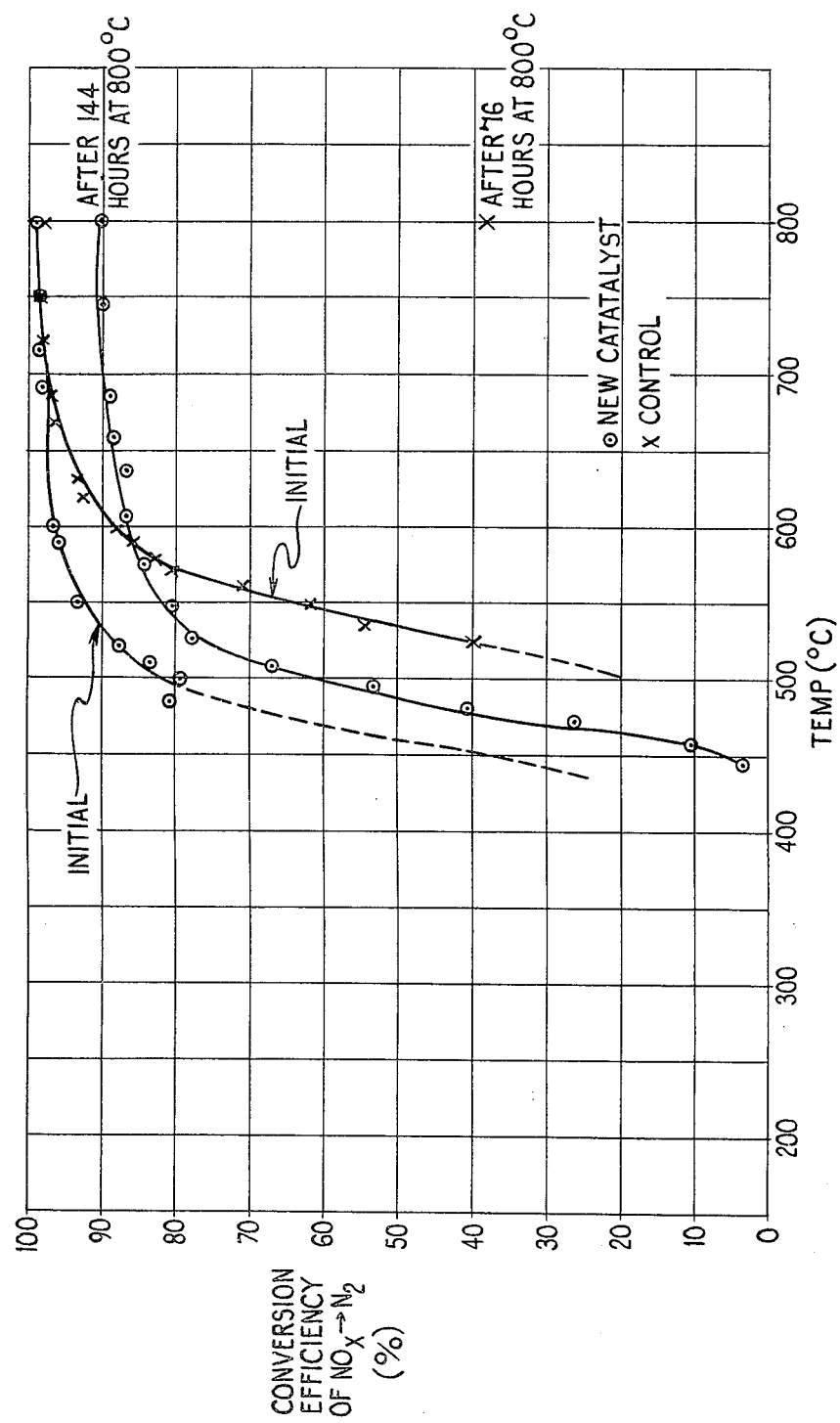

CATALYTIC PROCESS

This invention relates to a catalytic process for treating internal combustion engine exhaust gases and to a catalyst for the process.

It has been proposed to treat internal combustion engine exhaust gases over catalysts comprising metals or their compounds and refractory oxides for the purpose of decomposing nitrogen oxides and/or oxidising carbon monoxide and hydrocarbons. Many such processes of treatment are satisfactory while the catalyst is fresh but become less efficient after some use. We have traced one important cause of the loss of catalytic efficiency to chemical combination of oxides of non-noble metals with the refractory oxides to form inactive compounds. This occurs even under apparently net-reducing conditions in which non-noble metal oxides should not be present: possibly the combination occurs at times when the gas mixture composition fluctuates to net-oxidising conditions, or takes place by virtue of the oxygen present along with carbon monoxide, hydrogen and hydrocarbons, in exhaust gas freshly issuing from the engine. It appears also that free metal is oxidised by steam or carbon dioxide and taken irreversibly into combination.

We have found that if the acidic and amphoteric refractory oxides of the catalyst support are taken into combination with an added basic oxide, the loss of catalytic activity is usefully decreased. Catalysts on such supports appear to be usefully active for nitrogen oxides removal under only very slightly reducing conditions or even under slightly oxidising conditions, in contrast with many previously proposed catalysts, which have been active only under rather strongly net-reducing conditions. They are also effective for oxidising carbon monoxide and hydrocarbons.

The invention provides a catalyst comprising a non-noble metal or compound thereof and a catalyst support comprising a primary catalyst support carrying a secondary catalyst support, the secondary support consisting essentially of one or more involatile acidic and/or amphoteric oxides substantially in combination with one or more basic oxides from Group II, III or IV of the Periodic Table.

The catalyst support and catalysts in which it carries a platinum group metal are the subject of co-pending application Ser. No. 386,876 filed Aug. 9th, 1973.

The expression "primary support" denotes the material on which the catalyst depends for its mechanical shape and structure. The expression "secondary support" denotes the material with which the catalytically active material is to be intimately associated. The expression "substantially in combination" is intended to include catalysts in which free acidic or amphoteric oxide is present but is not accessible to the active material, or is present in a small amount relative to the active material so that, after all this additional acidic oxide has reacted with active material, sufficient excess active material remains for the catalyst to be still adequately active. Usually it is preferred to have at least 70% by weight of the acidic or amphoteric oxide in combination with basic oxides.

In this specification the composition of solids will be expressed as weight percentages based on the non-volatile materials present. The composition of gases will be in volumes per cent unless otherwise stated. The Periodic Table is as set forth in "Abridgments of Specifications" published by the UK Patent Office.

The acidic or amphoteric oxide of the secondary support can be for example alumina, silica, chromia, manganese oxide or iron oxide or mixtures or compounds thereof. These oxides, especially alumina and chromia would, if present in the free state in a catalyst, react with oxides of for example nickel, cobalt or copper to give spinels, which are very difficult to reduce. If more than one acidic or amphoteric oxide is present, the combination results in complicated mixed oxides, especially when silica is one of the acidic oxides. In particular aluminosilicates are preferred, on account of the stability of their compounds with basic oxides. Even when the acidic oxide is very weakly acidic, such as titania or zirconia, the combination with basic oxide can be advantageous.

The basic oxide of the secondary support is preferably an oxide of a metal of an A Group of the Periodic Table, especially of Group IIa, especially calcium strontium or barium or more than one of these, most conveniently calcium. Such oxides appear to be of general application, but other basic oxides are applicable to only certain of the acidic oxides. For example zirconium oxide is more basic than silica, and we find that zirconium silicate is inert to nickel oxide even at 1350°C. Zinc oxide can be present in combination with alumina. Some rare earth oxides are suitable as basic constituents of the combined oxide. It is possible to have some oxide of non-noble catalytic metal combined with acidic and/or amphoteric oxide in the secondary support, but this is usually to be avoided on economic grounds.

The secondary support can be added naturally-occurring or separately made material or the in situ reaction product of precursors or, when the primary support contains acidic and/or amphoteric oxides, the in situ reaction product of the added oxide with primary support. Among combined oxides that can be used are melilite (especially gehlenite $Ca_2Al_2SiO_7$ on account of its high melting point and inertness and, less preferably, the isomorphous compounds at intermediate stages to akermanite $Ca_2MgSi_2O_7$, and the higher-melting types of iron melilite), anorthite ($CaO.Al_2O_3.2SiO_2$), calcium silicates (such as rankinite, pseudowollastonite and wollastonite $CaO.SiO_2$ and also calcium orthosilicates $CaMSiO_4$ such as monticellites in which M is for example manganese, iron or cobalt) and calcium aluminates (especially those containing at least one molecule of CaO per molecule of $Al_2O_3$). It appears to be preferable to use combined oxides in which the basic oxide is present in a quantity that will give a stoichiometric compound with the acidic or amphoteric oxide considered as a monomeric acid; for example $CaO.Al_2O_3$ is preferred to $CaO.2Al_2O_3$. Thus also cordierite $Mg_2Al_4Si_5O_{18}$ is less suitable as a secondary support to be used at high temperatures, because it reacts with nickel oxide relatively readily.

If the basic oxide is unstable in steam, as is calcium oxide, it should be in a dead-burned state if it is present in substantial excess in a free state. Other oxides, such as those commonly used as catalyst supports, can be present in the secondary support, but is is usually found that the combined oxides do not require modification in this way.

The porosity of the secondary support, excluding voids between fibres or particles or open volume of multi-tubular matrices, is suitably in the range 30 to 70% by volume or greater. Its specific gravity is suitably 0.5 to 1.5 and its specific surface 0.01 to 250 m²/g. A method for producing secondary supports, and hence catalysts, of high porosity is described hereinafter.

The primary support can be in any convenient mechanical shape for example discrete particles (especially rounded granules), fibres and multi-tubular matrices or as a coating on any of such forms or on a metal substrate such as a wire, vessel wall or perforated structure or mesh. The primary support is preferably made of refractory non-metallic, especially oxidic, material and and can have been formed for example by casting, moulding, compression, extrusion, wet granulation or prilling in air or oil. If the primary support is a multitubular matrix, it can have been formed by moulding, extrusion, coating a convertible template such as aluminium foil or a fugitive template such as paper or cloth or by building-up from simpler shapes. If the primary support is fibrous, it can be made by various spinning and/or blowing procedures, followed if desired by felting, weaving or paper-making or bonding into self supporting units. Alternatively the primary support can itself be a metal substrate such as described.

When the primary support is a multi-tubular matrix, the cross-sectional shape of the passages in it can be for example triangles, squares, hexagons or the figures bounded by a wave and a straight line or shallow curve. The number of passages per square inch is suitably over 25 and may be as high as 200–600, though 40–500 appears to be the most useful range. The walls between the passages are typically 0.1 to 0.4 mm thick.

When the secondary support has been applied as such or is the product of reacting its precursors at the primary support surface, the proportion of secondary to primary support is suitably in the range 2–40%, especially 5–25% by weight.

When the secondary support is the product of reacting a basic oxide at the surface of the primary support the concentration of alkaline earth metal oxide, free and combined, is suitably 0.5 to 25%, especially 2.5 to 15%, calculated as equivalent CaO. When the primary support is in a shape having a geometric surface greater than that of particles (such as multi-tubular matrix or fibre), the proportion of alkaline earth oxide should be proportioned to the geometric surface. The concentration of alkaline earth metal (calculated as equivalent CaO, and including free and combined oxide is suitably in the range 0.2–10, especially, 1 to 6, milligrams per square centimetre of geometrical surface; such values correspond to the above weight percentages when the geometrical area is 32 cm²/cm³.

The primary support suitably comprises an oxide such as magnesia, alumina, silica, titania, zirconia, hafnia, thoria, chromia and mixtures or compounds of these with each other or with basic refractory oxides such as those of calcium, strontium or barium, in highly refractory forms such as fused magnesia, highly calcined alumina, calcined aluminosilicates, zircon-mullite, spinels and hydraulic cements. Especially useful primary supports include cyclosilicates, as discussed further below. Other suitable primary support materials include petalite, silicon nitride and silicon oxynitride.

Supports having specific surfaces in the range 0.1–100 m²/g, such as alumina calcined at 950°–1500°C, alpha alumina bonded with bentonite and suitably calcined kaolin/cement mixtures are especially suitable.

Although it is generally preferable to choose a primary support material that will afford the best possible thermal and mechanical resistance, the invention includes catalyst supports and catalysts that, for operative convenience, have the same material, a calcium aluminosilicate, for both the primary and the secondary support and, indeed, some that do not include a secondary support introduced as a distinct component, or some in which (see Example 2) the primary support itself contains catalytically active material. It is believed to be legitimate to refer to the primary and the secondary support in such catalysts because catalytic chemical reaction appears to take place largely in surface regions of the catalyst less than about 30 microns deep, so that the inner region of the catalyst fulfils only the function of a primary support.

Gehlenite and compounds isomorphous therewith are especially suitable when the same compound is to act as both the primary and the secondary support.

The primary support may be composed of a combination of acidic or amphoteric and basic oxides; examples are cyclosilicates such as cordierite, which has the empirical formula $Mg_2Al_4Si_5O_{18}$ and in which possibly some or all of the magnesium may be replaced by iron and/or manganese. In these compounds each magnesium (or iron or manganese) atom may be taken to account for two aluminium atoms, as in the compound $MgAl_2O_4$, and thus the silica is not neutralised at all. Equally each magnesium (or iron or manganese) atom can be taken to account for one silicon atom, so that three silicon atoms and four aluminium atoms are not accounted for. Probably neither explanation represents the true chemical situation and, in any event, cordierite as synthetically formed often contains other compounds. The result, however, is that good adhesion of calcium aluminosilicate secondary supports is obtained, and the cordierite structure is protected from attack by oxides such as nickel oxide.

When the primary support is a matrix made of bonded refractory fibres it can be in any form, for example, a set of refractory paper sheets supported in a suitable block or framework or a block of fibres having sufficient permeability to allow gas to pass through or having through-passages. The fibres can be made of any material having suitable mechanical properties, for example, of alumina, silica, aluminosilicate, glass wool, chromia, titania or zirconia. Fibres composed substantially of alumina and/or zirconia of thickness under 10 microns and substantially free of particles known as "shot" are very suitable; and these may be made by fiberising a viscous composition comprising an aqueous solution of a slat of aluminium and/or zirconium and a water-soluble organic polymer, drying the fibre formed, and heating to decompose the salt to oxide and to decompose the polymer, especially as described in our co-pending US application Serial No. 152429, now abandoned which specification is incorporated herein by reference. The refractory bonding of the fibres can be by for example any of the compounds of which the fibres could be composed and these can be applied in the form of colloidal solutions, aqueous solutions of thermally decomposable compounds or organic thermally decomposable compounds.

In the catalyst according to the invention the active material preferably comprises metallic nickel or cobalt or an alloy of these, possibly containing small proportions of copper or silver or a platinum group metal or more than one of these. The nickel or cobalt or nickel/- cobalt alloy content of the complete catalyst is suitably in the range 2 to 50%, by weight, calculated as monoxides; the content on the total of monoxides and secondary support is thus suitably 5-95%. If copper is present its content, calculated as CuO, is preferably 2-10% of the said monoxides; and if a platinum group metal is present its content is preferably 0.001 to 1.0%, calculated on the total of monoxide and primary and secondary support. Such catalysts are suitable for net-reducing or incompletely-oxidising treatment of exhaust gases; and, if an oxidising treatment is to be carried out, the active material can be any of the oxides of the above non-noble metals and/or one or more oxides of copper, manganese or chromium or, less preferably, other non-noble transition metals. The concentration of such oxides is suitably the same as in the reductive catalysts, and the same content of platinum group metals can be used. (In such catalysts the content of manganese is calculated as MnO and of chromium as $Cr_2O_3$, their lower oxides).

The platinum group metal in the catalyst includes preferably platinum and/or rhodium if the process is to be under net-reducing or about neutral conditions. It preferably includes platinum and/or palladium if the process is to be an oxidation.

For making the catalyst the invention provides a number of methods differing chiefly in the manner in which the support is made. In some of these catalytic material can be added before the formation of the secondary support is complete.

One method comprises making a suspension of finely divided secondary support material in a liquid, applying the suspension to the surface of the primary support. The suspension may contain adjuvants such as soluble polymers or surface active agents to improve its stability and promote temporary adhesion. Usually adhesion can be improved by subsequent heat treatment at, for example, at least 800°C, especially 900°-1200°C. These temperatures apply especially to calcium alumino-silicate systems. Suitable temperatures for other systems can, of course, be obtained experimentally.

A second method comprises applying to the primary support a solution or suspension of secondary support precursors, that is, compounds reactable together to produce the secondary support. A heat treatment is desirable to effect the reaction and cause adhesion.

A third method comprises selecting a primary comprising at least one of the oxides to be combined in the secondary support, applying the other oxides to be combined therein and causing reaction to produce the secondary support at the surface of the primary support. A heat treatment as in the second method is desirable. Preferably the primary support comprises acidic and/or amphoteric oxides and a basic oxide is applied to it. When the applied oxide is to be an alkaline earth oxide, the primary support is impregnated conveniently with the nitrate, but other suitable decomposable salts are the nitrite, bicarbonate, carboxylate (such as formate, acetate or citrate). Hydroxides are suitable and also silicates, aluminates and aluminosilicates, provided they are adequately dispersed to make up for their low solubility. Insoluble compounds can be used as a slurry alone or in conjunction with soluble compounds. Hydrolysable compounds such as halides can be used, but have the disadvantage of requiring steam treatment in order to produce oxide under readily accessible conditions. Any convenient method, for example, dipping or spraying, can be used for applying the secondary support material or precursor to the primary support. After applying the alkaline earth compound, it is suitably dried, e.g. at 120°C, before the calcination. Calcination is preferably at a temperature in the range 600°-1400°C, especially 800°-1200°C, so as to give an oxide layer and/or to effect combination with the primary support.

In these three methods a primary support having the desired shape is used as starting material. A fourth method, however, comprises forming a calcium aluminosilicate or precursors thereof in the shape required. As explained, the secondary support is constituted by the surface layers of such a shape. In this method, catalytic material may be present in the material before the forming operation; this has the advantage that a catalyst is produced in a single operation.

Whichever method is used, it is preferred to effect the heat treatment at over 800°C, especially 1000°-1600°C. Preferably it is carried out in the presence of steam, since this accelerates the reactions causing adhesion or producing the secondary support. The heat treatment can be carried out in more than one stage; for example the support can be mildly calcined, for example at up to 600°C, or even merely dried, and the remaining heat treatment carried out by the user of the support. The latter is convenient when catalytic material is present, as in methods 1, 2 and 4 above.

Combinations of the methods may be used, if desired. In these methods if a catalytic material precursor is present before formation of secondary support is complete and is of a type that can react with secondary support precursors, it is preferably reduced to metal before the heat treatment.

The secondary support is produced preferably in the presence of a compound thermally decomposable to form a highly porous solid, but preferably substantially stable at up to 600°C, especially 1100°C. This has the effect of increasing the porosity of the secondary support, but the effect is different from that produced by ingredients decomposable at lower temperatures. Thus organic materials and graphite have decomposed or burned before combination between the basic oxide and the acidic or amphoteric oxide has proceeded too any extent. A very suitable thermally decomposable compound is calcium carbonate, which, decomposes in air at a substantial rate only at over 740°C. Other compounds such as the carbonates of magnesium, strontium and barium are of comparable stability. It is within the invention to perform the heating step in the presence of an atmosphere containing more carbon dioxide than air contains, in order to increase the decomposition temperature. The decomposable compound is very suitably the source of the basic oxide. Increases in porosity may also be obtained by the use of hydrated oxides.

For methods 2 and 4 and combination methods the starting materials may be already reaction products of basic and acidic or amphoteric oxides. For example calcium carbonate, calcium silicate $CaSiO_3$ and anorthite $CaAl_2Si_2O_8$ may be reacted to produce gehlenite.

When employing method 4, various forming methods can be used and have been mentioned in describing the support structurally. When the shape is a multi-tubular matrix a preferred method involves making a plastic composition comprising the compound decomposable to a highly porous solid, the combined oxides or mixture of oxides or compounds decomposable or reactable thereto, a liquid and a viscosity-controlling substance soluble in or swellable by the liquid and forcing it successively through a zone comprising a plurality of discrete primary channels within a solid block, then a unifying zone comprising secondary channels within the same block, the secondary channels being inter-linked, and the aggregate cross-section of the secondary channels being equal to or sufficiently less than that of the primary channels and the time of passage through the secondary channels being sufficiently long to effect unification of the feed into a matrix, drying the extrudate thus produced, and heating it to give combined oxide. Such a method is described more specifically in our co-pending US application Ser. No. 24887, now U.S. Pat. No. 3,824,196, which is incorporated herein by reference.

For this method the heating should be sufficient to bring the extrudate to a condition in which it can be handled. Thereafter it may be heated further by the maker or user of the catalyst to complete the production of the combined oxide or to give ceramic bonds or both. Catalytic material and/or material convertible thereto may be present in the extruded composition or may be added later.

The compound decomposable to a highly porous solid can be one of the basic or acidic or amphoteric oxides.

When the heating to the combined oxides is to be carried out by the catalyst-maker, it is preferably at 1000° to 1600°C. A suitable time is in the range 2–40 hours.

The present invention provides a particular method of making the catalyst applicable especially to methods 2 and 4, in which the heat treatment of the support or catalyst is effected by means of a stream of gas in which an exothermic oxidation reaction is taking place. The gas stream can be any that will give the required temperature, which is preferably 800°–1600°C. Preferably it contains an oxidisable compound that does not form undesirable by-products; for example the compound may be hydrogen, carbon monoxide and mixtures thereof. Hydrocarbon vapours can be used if carbon-producing conditions are avoided, for example by limiting their volumetric concentration in the gas. A very suitable gas is one resulting from incomplete combustion of a hydrocarbon fuel with air. Thus the effluent from a rich-running internal combustion engine, containing preferably 3–8% by volume of carbon monoxide is, after addition of air, a convenient gas to use. Such a gas usually contains free hydrogen, to the extent of 1 to 3% by volume. If the heat treatment takes place after incorporation of catalytic material, this is apparently preferable, since then some catalytic oxidation takes place.

Thus the invention provides a method of starting-up a catalytic process for exhaust gas treatment, by adjusting the engine fuel injection or carburation system to give an exhaust containing 3–8% by volume of carbon monoxide, feeding air to the gas to oxidise carbon monoxide and heat the gas to a temperature over 800°C, and reacting the resulting mixture in the presence of the catalyst, the catalyst being initially in an uncalcined or incompletely heat treated condition, until substantial production of the compounds of basic and acidic and/or amphoteric constituents of the catalyst has taken place. If the process is for reductive decomposition of nitrogen oxides, the air supply is thereafter shut off and the engine re-adjusted to normal operating conditions, giving an exhaust containing up to 2% by volume of carbon monoxide. Such a method can be conveniently used by service stations or by drivers, especially on automobiles already equipped for warming-up the $NO_x$ removal catalyst bed under oxidising conditions.

Preparation of catalyst starting from complete support can be for example by impregnating the combined primary and secondary support with a solution of a compound thermally decomposable to a catalytically active material; heating to effect the thermal decomposition and, if required, reducing the product of such decomposition to metal are then carried out if the active material is a non-noble metal or oxide. In this method the catalytic material should preferably be confined as much as possible to the secondary support and the impregnation conditions chosen accordingly, for example, by control of the volume of the impregnating solution. If there is an impregnation with a compound of a platinum group metal, a salt or an ionic or non-ionic complex can be used. Complexes such as ammines are useful owing to their resistance to hydrolysis. Impregnation may be in conjunction with a treatment with an organic acid or with an insolubilising step such as reduction or sulphiding.

Any convenient method, for example dipping or spraying, can be used for the above impregnation. For heating catalyst precursors a temperature in the range 300°–800°C is suitable. Reduction is required if the catalyst is to be used for a reductive treatment of exhaust gases, but is not usually carried out by the catalyst-maker, since it takes place in contact with the exhaust gas. Reduction followed by re-oxidation can be employed in making a catalyst for oxidation. The product ("catalyst precursor") ready for charging to a reductive exhaust gas reactor but requiring reduction therein is the usual article of commerce.

The invention provides a process of exhaust gas treatment using the catalyst. This may be reductive for the removal of nitrogen oxides or oxidative for removal of carbon monoxide and hydrocarbons. A reductive stage may be followed by air-addition and an oxidative stage. In some circumstances, depending on engine design and local emission standards, it is possible to use a single catalyst, preferably of the type described herein containing one or more platinum group metals, for removing nitrogen oxides, carbon monoxide and hydrocarbons simultaneously from an exhaust gas containing, possibly as the result of continuous air-addition, reductive and oxidative components in approximate equivalence. Whenever the process removes nitrogen oxides, the exhaust gas is preferably passed over a pre-oxidation bed in order to remove residual oxygen. The process of $NO_x$ reduction is preferably started up in the presence of added air until the catalyst operating temperature has been reached.

When the process of the invention is to be used for nitrogen oxides removal the reducing power of the gases as expressed by the function $CO + H_2 - 2O_2$ where "CO", "$H_2$" and "$O_2$" are volume percentages, is preferably positive. However a reducing power greater than 8 corresponds to poor fuel economy, CO being over 2% and $O_2$ under 0.3%. The carbon monoxide content of the gases need not, in general, be over 2%, and, indeed, engines designed to use a stoichiometric or slightly "lean" fuel mixture can be made non-polluting by the process of the invention. Further, the process affords effective removal of nitrogen oxides in systems in which air is added as a regular measure or for warming up. The best use of nickel-copper catalysts and like non-noble metal catalysts is made when the reducing power is in the range 0.5 to 6.0. When a platinum group metal is also present the reducing power can be lower, even down to approximate equivalence.

The temperature for the process, whether reductive or neutral, is normally over 300°C, preferably over 500°C. It is preferably over 600°C, for example 650°–850°C, when the catalyst does not contain a platinum group metal, but 500°–700°C when a platinum group metal is present. These temperatures relate to steady running conditions, not involving start-up or heavy accelerations, corresponding to the "stabilised mode" of the test as laid down in the United States Federal Register 36 No 128, 2 July 1971. In air-assisted warm-up or heavy acceleration the temperature can rise 150°–200°C above the steady running level.

If the exhaust treatment process is an oxidation, it is carried out suitably at temperatures in the range 200°–1000°C. When it is intended for complete oxidation of exhaust gases, whether as the sole catalytic treatment applied to such gases, or as an oxidation following nitrogen oxides removal under netreducing conditions, the temperature is typically 400°–850°C and rises in the direction of gas flow, owing to the heat of reaction. For complete oxidation the rate of oxygen feed (usually as air) should be sufficient to oxidise all the carbon monoxide and hydrocarbon present and afford a moderate excess for example up to 2% v/v. It can, however, be used for incomplete oxidation, using a deficiency of oxygen and operating at a lower temperature. One example of such a use is in the preliminary removal of oxygen from a netreducing exhaust gas, as a preliminary to treatment over a nitrogen oxides removal catalyst, as descibed in our co-pending U.S. application Ser. No. 248811, now abandoned, incorporated herein by reference.

The space velocity of the process depends on the shape of the catalyst, but is typically (for granular or matrix catalyst) in the range $0.10$ to $3.0 \times 10^5$ hour$^{-1}$ for separate reduction or oxidation or combined reduction and oxidation and 2–5 times this range for an oxidation preliminary to nitrogen oxides removal, if such a bed is used. It will be appreciated that when the engine drives a vehicle the space velocity is likely to range between lower and upper levels differing by a factor of as much as 10, more probably up to 6.0, in town conditions in which the rate of engine revolution is compensated by gear-changing. The volume of catalyst should be ample for the very high gas-flows during accelerating-away in town traffic. The space velocity definition is to be understood as denoting a range $SV_1$ to $SV_2$ where $SV_2$ is from 6 to 10 times $SV_1$ within the stared broad range. Such space velocities correspond to catalyst volumes that are convenient for automobile use, for example 0.5 to 5.0 liter, according to engine size and characteristics.

The invention provides further a reactor containing the catalyst and having an inlet port suitable for connection to an engine and an outlet port; and also an internal combustion engine having one or more such reactors in its exhaust line.

The gasoline fed to the engine suitably has a sulphur content of less than 200 ppm w/w (as S) and less than 0.4 g of lead (as Pb) per US gallon (3.8 liters), preferably under 0.01 g. The phosphorus content of the gasoline can be up to 500 ppm without significant detriment, using suitably chosen catalytically active materials.

The following Examples include one test by the US Federal procedure (8) and laboratory tests, some with an engine, in conditions found to be correlated therewith. The Federal procedure may be summarised as follows. From a cold start the first 505 seconds' is collected in bag A and then the gas from succeeding operation, known as "stabilised mode", in bag B (total time 1369 seconds). The first 505 seconds include two heavy accelerations and the stabilised mode includes a succession of standstills (without engine stop) and runs at moderate speed. Then follows a 10 minute standstill with engine stop and a repeat of the first 505 seconds, the exhaust being collected in bag C. The emission levels for each bag are calculated in grams and added together by the formula $(0.43A + B + 0.57C) \div 7.5$, where 7.5 is the number of miles driven in the test. The allowable limits quoted in Example 8 are those originally set for 1976, but it is understood that less stringent limits may be set in the near future.

Where catalyst activity is expressed in terms of a first order velocity constant $k$ or $k_{N_2}$ sec$^{-1}$, this has been calculated by the formula $$k \text{ or } k_{N_2} = \frac{2.3 \, SV}{3600} \log_{10} \frac{1}{1 - 0.01C}$$

where SV is volume hourly space velocity
C is percentage conversion of $NO_x$ to $N_2$ It will be evident that catalysts according to the invention of high activity and stability; so far, satisfactory $NO_x$ removal has been achieved in runs equivalent to up to 27000 miles.

EXAMPLE 1

Gehlenite support: nickel-copper catalyst
The following mixture was prepared:
992g alpha alumina powder
2144g precipitated calcium carbonate powder, heavy
864g bentonite
600g Pre-soaked starch sold under the name "Kordek"
900g Water It was mixed thoroughly until the starch had dissolved, then pugged and forced by means of an extrusion screw through a one-inch square die having 15 slots parallel to each side and 16 slots parallel to each diagonal, making a total of 512 cores, each in the shape of a right-angled triangle. The resulting multi-tubular extrudate was dried, heated slowly up to 1280°C and calcined at 1280°C for 10 hours. The product had the following percentage composition by weight (calculated):

| | |
|---|---|
| CaO | 41% |
| $Al_2O_3$ | 37% |
| $SiO_2$ | 22% |

Its porosity was 53% v/v and specific surface 0.3 m$^2$/g. By X-ray diffraction examination it was shown to contain gehlenite as major phase, with monocalcium aluminate and a calcium silicate as minor phases.

Its bulk density was 0.6 g/cc; and it appeared to be strong enough for use in a reactor for treating automobile exhaust gas.

It was impregnated with copper and nickel nitrates by dipping into a mixed solution, draining, and drying, and then calcined at 450°C. After 1, 2 and 3 immersions the weight percentage contents of nickel oxide and cupric oxides were shown in Table 1.

Table 1

| Immersions | 1 | 2 | 3 |
|---|---|---|---|
| NiO | 10.1 | 16.3 | 22.1 |
| CuO | 1.0 | 1.5 | 2.1 |

In this catalyst the surface regions of the catalyst constitute the secondary support.

ACTIVITY AND STABILITY

Laboratory test

A half-inch length of the catalyst made by 2 immersions was tested in a gas having the volume percentage composition CO 2.0, $H_2$ 0.7, $CO_2$ 13, $H_2O$ 15, $O_2$ 0.3, NO = 1500 ppm, $SO_2$ = 7–10 ppm, $N_2$ = balance, at a flow rate of 550–600 1/hour (space velocity 65000–70000 hour$^{-1}$) at a range of temperatures up to 800°C. A similar catalyst but made of bentonite — bound alumina with an alumina trihydrate coating was tested as a control.

A similar test was carried out after operation for 144 hours (new catalyst) or 76 hours (control) at 800°C. The percentage conversions of nitrogen oxides to nitrogen are shown in Graph I.

It is evident from the graph that a. the gehlenite-based catalyst is more active initially at all temperatures below about 700°C.

b. the gehlenite-based catalyst is much more active at 500°C, that is, it has a lower "strike temperature".

c. the gehlenite-based catalyst loses activity much more slowly (from 99 to 90 in 144 hours) than the alumina-based catalyst (98 to 38 in 76 hours). It was observed that the activity of the gehlenite-based catalyst had settled out at the 144 hour level.

Engine Durability a. A one-inch length of 4½ inch diameter matrix having 288 passages per square inch but of the same composition was immersed three times in the mixed nitrate solutions, drying and calcining after each immersion, and tested at 800°C in the exhaust from a Ford Cortina 1600 cc engine running at about 3100 rpm under a dynamometer load corresponding to 50 mph road load conditions. The fuel used was a 99 octane mixture containing 54 ppm w/w of sulphur but no lead or phosphorus. The exhaust gas contained 2% of CO, 0.5 ± 0.1% of $O_2$ and 2000–2500 ppm v/v of $NO_x$. It was passed over the catalyst at a space velocity of 1.7 to 2.0 × 10$^5$ hour$^{-1}$. The activity for conversion of nitrogen oxides to nitrogen was measured over a period of 145 hours and expressed as velocity constant $k_{N_2}$, the values of which were as follows:

| Time, hours | 2 | 19 | 42 | 62 | 78 | 100 | 125 | 145 |
|---|---|---|---|---|---|---|---|---|
| $k_{N_2}$ | 49 | 44 | 35 | 53 | 51 | 47 | 46 | 40 | b. After 145 hours at 800°C, when it was evident that negligible deactivation was occurring, the carburetter was adjusted to give 4% CO in the exhaust and air was added to the exhaust so that there was approx. 0.5% $O_2$ excess (i.e. above 2.5% $O_2$, or 13% air added). Over the catalyst, the CO, $H_2$ and hydrocarbons reacted with the $O_2$ to produce a considerable exotherm associated with the removal of over 90% CO, for example the exit gas temperatures were thus increased to at least 980°C and the catalyst surface temperatures were probably very much higher.

After running for 1 hour in these conditions the catalyst was tested again in the normal conditions of 2% CO, 800°C. The activity was found to be better (68) than before. Under these conditions, alumina-nickel catalysts would have lost activity.

Variation of Activity with air/fuel ratio

The catalyst used in test (a) was, after the 145 hours at 2% CO, tested at a range of reducing power by varying the air/fuel ratio by carburetter adjustments. (This changed also the percentages of other gases, including oxygen and nitrogen oxides). The results are shown in Table 12, It is evident that activity is present at least to the stoichiometric level, probably slightly on the lean side.

Table 2

| $CO + H_2 - 2O_2$ vol. % | $CO/O_2$ | $k_{N_2}$ sec$^{-1}$ |
|---|---|---|
| −0.5 to −0.78 | 0.8 to 1.1 | 0 |
| −0.1 to −0.3 | 1.2 to 1.5 | 19 |
| −0.04 to +0.2 | 1.45 to 1.75 | 36 |
| −0.02 to +0.3 | 1.2 to 1.5 | 41 |
| 0.16 to 0.44 | 1.7 to 2.0 | 42 |
| 0.68 to 0.92 | 2.3 to 2.65 | 48 |
| 0.88 to 1.12 | 2.7 to 3.0 | 48 |
| 1.24 to 1.5 | 3.35 to 3.75 | 47 |
| 1.5 to 1.72 | 3.7 to 3.95 | 47 |
| 1.6 to 1.86 | 4.05 to 4.45 | 50 |

EXAMPLE 2

Gehlenite matrix containing nickel and copper: calcination by exothermic gas reaction The following mixture was prepared:

992 g alpha alumina powder ex Ramsden 2144 g precipitated calcium carbonate powder, heavy 864 g bentonite 600 g pre-cooked starch sold under the name "Kordek"

1233 g coarse powdered nickel oxide 100 g finely powdered cupric oxide

It was mixed dry, then with water to form a thick paste. The paste was pugged and forced by means of an extrusion screw through a 4 inch diameter die having per square inch 11 slots parallel to each side of the square and 12 slots parallel to each diagonal, making a total of 288 cores, each in the shape of a right-angled triangle. The slots were 10 ×10$^{-3}$ inch wide. The resulting multi-tubular extrudate was dried but not calcined. A piece of the matrix 1.25 inch long was set up in a converter in the exhaust of the engine described in Example 1, running on a similar fuel but of 101 Octane rating. The exhaust gas contained 2% of CO, 0.5±0.1% of $O_2$ and 2000–2500 ppm v/v of $NO_x$. It was passed over the matrix at 800° and at a space velocity of 1.4 to 1.6 × 10$^5$ hour$^{-1}$ and reduced the nickel oxide and copper oxide. The outlet gas was analysed for nitrogen oxides and ammonia and the results used to calculate the velocity constant $k_{N_2}$. The value of $k_{N_2}$ for the catalyst in its incompletely calcined state was 40.

The calcination of the catalyst was then completed by adjusting the engine carburetter to give 4–5% of CO in the exhaust gas and feeding oxygen (as air) slightly in excess of the CO, to the engine exhaust manifold. Combination of the CO with oxygen raised the gas temperature to about 1000°C measured at the outlet of the catalyst. These conditions were maintained for 10 minutes, whereafter the air supply was stopped but the rich gas flow continued until the catalyst had cooled to 800°C, and then the carburetter was readjusted to give 2% of CO. The value of $k_{N_2}$ was now found to be 100 sec$^{-1}$. After 20 hours' operation $k_{N_2}$, was found to be 65 sec$^{-1}$, but no further decrease took place over the next 70 hours.

The particle size distribution of the nickel oxide was as follows.

Table 3

| Particle Size Distribution of Metal Oxide | |
|---|---|
| Cumulative percent | Particle diameter (microns) |
| 0.5 | 2.5 |
| 9.0 | 5.0 |
| 27.0 | 7.5 |
| 51.0 | 10.0 |
| 94.0 | 15.0 |
| 99.0 | 20.0 |
| 100.0 | 30.0 |

In this catalyst the surface regions of the matrix constitute the secondary support. The regions beneath the surface constitute the primary support, even though they contain nickel oxide and cupric oxide.

EXAMPLE 3

Gehlenite secondary support on cordierite primary support

A. Gehlenite applied as such by slip-coating.

A 1.25 inch length of 4-inch diameter spiral cordierite matrix, supplied by 3M Corporation (American Lava Corporation) and having about 450 passages per square inch, each having the cross-sectional shape of the figure bounded by a sine-wave and an arc, was coated with gehlenite by dipping twice into a colloid-milled 27% w/w suspension of gehlenite in water. After each dip the coated matrix was calcined at 1000°C for 1 hour. The weight percentage of gehlenite applied was 6.5.

The gehlenite had been made as described in Example 1.

B. Calcium aluminosilicate made in situ

A matrix sample similar to that used in A was impregnated twice with saturated aqueous calcium nitrate solution. After each impregnation the sample was calcined at 1000°C for 1 hour.

C. Control: matrix sample without pre-treatment. Nickel-copper-platinum catalysts Each catalyst support was impregnated with a solution at pH2 containing the nitrates of nickel and of copper and ammine platinic chloride in the proportions 90.5% NiO, 7.15% CuO and 0.36% Pt. The impregnated support was drained, dried at 130°C and then calcined at 650°C for 4 hours. The impregnation was repeated once for catalyst support A and twice for B and C.

Nitrogen Oxides removal process

A gas mixture simulating internal combustion exhaust gas and containing by volume

| | |
|---|---|
| $NO_x$ | 1940 ppm |
| CO | 2% |
| $H_2$ | 0.7% |
| $O_2$ | 0.3% |
| $CO_2$, $N_2$, steam | balance | was passed over each catalyst at a space velocity of 7 × 10$^4$ hour $^{-1}$ at temperatures in the range 500°–800°. Runs were carried out first at successively increasing temperatures, then a steady run of 60–90 hours was carried out at 800°C, then runs were carried out at successively decreasing temperatures in the range. The outlet nitrogen oxides and ammonia contents were measured and used to calculate a first-order velocity constant.

Table 4 shows the values of k(u) for the runs at successively increasing temperatures, k(d) for the runs at successively decreasing temperatures, and the ratio $$\frac{k(d)}{k(u)},$$

which measures the proportion of activity remaining after the steady run and other runs so far carried out in the test.

Table 4

| Catalyst | Composition % w/w | | | Activity and Stability | | Time at 800°C | k(d) | k(d)/k(u) |
|---|---|---|---|---|---|---|---|---|
| | NiO | CuO | Pt | Temp. °C | k(u) sec$^{-1}$ | hours | | |
| A | 18.3 | 1.1 | 0.03 | 500 | 3.4 | 71 | 21 | 6.17 |
| | | | | 550 | 20.0 | | 34.5 | 1.73 |
| | | | | 600 | 32.0 | | 42.8 | 1.21 |
| | | | | 650 | 40.0 | | 48.5 | 1.21 |
| | | | | 700 | 48.0 | | 52.5 | 1.09 |
| | | | | 750 | 53.0 | | 62.0 | 1.07 |
| | | | | 800 | 54.0 | | 70.0 | 1.29 |
| B | 9.8 | 2.3 | 0.03 | 500 | 15.8 | 71 | 10.0 | 0.63 |
| | | | | 550 | 21 | | 18 | 0.86 |
| | | | | 600 | 28 | | 28 | 1.0 |
| | | | | 650 | 39 | | 37 | 0.95 |
| | | | | 700 | 54 | | 45 | 0.83 |
| | | | | 750 | 55 | | 56 | 1.02 |
| | | | | 800 | 56 | | 66 | 1.18 |
| C (control) | 22.9 | 1.4 | 0.01 | 500 | 0.5 | 90 | 2.6 | 5.2 |
| | | | | 550 | 10.5 | | 4.0 | 0.38 |
| | | | | 600 | 36 | | 5.8 | 0.16 |
| | | | | 650 | 66 | | 6.9 | 0.104 |
| | | | | 700 | 86 | | 8.6 | 0.10 |
| | | | | 750 | 107.5 | | 9.4 | 0.09 |
| | | | | 800 | 80 | | NA | NA |

EXAMPLE 4

Gehlenite on bonded fibre matrix

A cylindrical matrix consisting of bonded alumina fibres, supplied by Société Générale des Produits Refractaires under the name "Fibral" and having a diameter of 8 cm, an axial length of 34 cm and 105 passages 15 mm wide per 25 mm square formed in it parallel to its axis, was soaked in water and then drained and coated with gehlenite from a 16% w/v slurry. It was dried and calcined at 1200°C for 1 hour. This process was repeated. The uptake of gehlenite was 13.6% w/w. The coated matrix was then impregnated twice with a solution containing nickel nitrate, copper nitrate and ammine-platinic chloride, drying and then calcining at 650°C for 4 hours after each impregnation. The content of nickel oxide in the matrix was 34.7%, of copper oxide 2.8% and of platinum 0.05%.

The catalyst was tested by passing over it at 700°C and at a space velocity of 210000 to 250000 hour$^{-1}$ the exhaust gas from the engine described in Example 1. The activity for conversion of nitrogen oxides to nitrogen was measured over a period of 193 hours and expressed as velocity constant $k_{N_2}$.

During the period of operation carburetter adjustments were made from time to time in order to give carbon monoxide contents of 2.0 or 1.5% v/v, and the inlet and outlet concentrations of carbon monoxide, oxygen, nitrogen oxides and ammonia were measured at both carburetter settings. The results are shown in Table 5.

12.7% w/w. It was then impregnated three times with nickel-copper-platinum solution as described in Example 4. The content of nickel oxide was 17.0%, of copper oxide 1.4% and of platinum 0.1%.

The catalyst was tested using the engine described in Example 1. The rate constant $k_{N_2}$ was determined at nitrogen oxides and ammonia and values of $k_{N_2}$ after 23 99 hours, at an inlet temperature of about 700°C and at a space velocity of 140000 hour$^{-1}$. Table 6 shows the inlet and outlet contents of carbon monoxide, oxygen, nitrogen oxides and ammonia and values of $k_{N_2}$ after 23 and 99 hours' operation. It is evident that substantially no loss of activity has occurred.

Table 6

| Hours | Temperature | | % CO | | % $O_2$ | | ppm NO | | ppm NH | $k_{N_2}$ |
|---|---|---|---|---|---|---|---|---|---|---|
| | inlet | outlet | inlet | outlet | inlet | outlet | inlet | outlet | outlet | |
| 23 | 695 | 732 | 1.2 | 0.6 | 0.54 | 0.0 | 2230 | 500 | 21 | 56.2 |
| | 705 | 740 | 1.5 | 0.9 | 0.47 | 0.0 | 2140 | 320 | 22 | 70.3 |
| | 701 | 720 | 2.0 | 1.4 | 0.39 | 0.0 | 2020 | 240 | 36 | 77.3 |
| | 697 | 717 | 2.5 | 2.0 | 0.32 | 0.0 | 1860 | 210 | 55 | 76.4 |
| 99 | 705 | 742 | 1.1 | 0.4 | 0.63 | 0.0 | 2200 | 980 | 10 | 30.1 |
| | 704 | 733 | 1.5 | 1.0 | 0.50 | 0.0 | 2120 | 330 | 35 | 67.2 |
| | 701 | 720 | 2.0 | 1.4 | 0.39 | 0.0 | 1990 | 250 | 55 | 70.9 |
| | 696 | 719 | 2.4 | 1.9 | 0.34 | 0.0 | 1890 | 170 | 50 | 81.3 |

EXAMPLE 6

A sample of catalyst similar to that used in Example 5 but having about 450 passages per square inch was subjected to a longer life test at a space velocity of 165000 and a carbon monoxide level of 2%. The values of $k_{N_2}$ at times up to 262 hours are shown in Table 7, together with the oxygen contents obtaining at the time of measurement.

Table 7

| Time(hours) | 3 | 22 | 47 | 94 | 134 | 183 | 262 |
|---|---|---|---|---|---|---|---|
| $O_2$% | 0.41 | 0.46 | 0.51 | 0.46 | 0.46 | 0.45 | 0.34 |
| $k_{N_2}$ | 113 | 108 | 113 | 96 | 99 | 81 | 67 |

It is evident that the catalyst has retained a substantial part of its activity after a time corresponding to 13000 miles operation.

Table 5

| Time on Line (hrs) | CO Inlet | CO Exit | $O_2$ Inlet | $O_2$ Exit | NO Inlet | NO Exit | $NH_3$ Exit | $k_{N_2}$ (sec$^{-1}$) | Gas Rate m$^3$/hr |
|---|---|---|---|---|---|---|---|---|---|
| 0.9 | 1.5 | 0.8 | 0.5 | 0.08 | 2320 | 1160 | 15 | 46.6 | 42.5 |
| | 2.1 | 1.5 | 0.35 | NIL | 2150 | 880 | 50 | 57.4 | |
| 44.1 | 2.0 | 1.5 | 0.46 | 0.02 | 2400 | 950 | 50 | 59.3 | 42.4 |
| | 1.5 | 0.9 | 0.56 | 0.07 | 2480 | 1040 | 12 | 58.4 | |
| 136.1 | 2.0 | 2.0 | 0.22 | NIL | 1460 | 680 | 40 | 40.5 | 35.5 |
| | 1.5 | 1.2 | 0.33 | NIL | 1600 | 770 | 15 | 40.8 | |
| 193.6 | 2.0 | 2.0 | 0.34 | 0.06 | 1350 | 710 | 38 | 33.8 | 35.5 |
| | 1.5 | 1.3 | 0.38 | 0.10 | 1540 | 840 | 12 | 34.0 | |

It is evident that the catalyst still has substantial activity after 193.6 hours' operation.

EXAMPLE 5

Gehlenite on cordierite: nickel-copper-platinum catalyst Life test at a range of reducing power A sample of synthetically produced cordierite matrix of volume 260 ml., having about 300 passages per square inch each in the cross-sectional shape of the figures bounded by a sine-wave and a straight line, was coated with gehlenite by two impregnations, as described in Example 4. The uptake of gehlenite was

EXAMPLE 7

Copper-chromium oxides with palladium on gehlenite on cordierite

A catalyst support was made as described in Example 1 was immersed in a ballmilled 14% w/w aqueous suspension of copper chromite dried at 120°C and calcined at 650°C for 4 hours. This procedure was repeated twice. The total uptake of copper chromite was 12.2%. The resulting coated support was immersed in a palladium nitrate at a concentration calculated to apply 0.05% w/w of palladium, then drained and dried.

Test in exhaust gas oxidation

The catalyst was tested by passing over it, at a space velocity of $1.6 \times 10^5$ hour$^{-1}$ the engine exhaust described in Example 1, into which 17% v/v of air had been fed. The percentage conversions of carbon monoxide and hydrocarbon were as shown in Table 8

Table 8

| Time, hours | Percentage conversions | | | |
|---|---|---|---|---|
| | inlet CO 2% | | inlet CO 1.5% | |
| | CO | hydrocarbon | CO | hydrocarbon |
| 2 | 92.4 | 69.9 | 88.7 | 74.7 |
| 46.2 | 86.2 | 61.5 | NA | NA |
| 65.2 | 84.9 | 58.3 | 92.9 | 67.1 |

It is evident that the catalyst loses activity only very slowly.

EXAMPLE 8

Behaviour of nickel-copper-platinum-gehlenite-cordierite $NO_x$ removal catalyst in US Federal test.

A 4-cylinder British Leyland Marina engine of capacity 1796 cc(112 cu. in) and compression ratio 8.0 was equipped with a reactor (1) adjacent to the cylinder head containing $NO_x$ removal catalyst, followed by a pipe containing an air-injection nozzle and leading to an oxidation reactor(2). The engine was fuelled with a 91.7 Research Octane (82 Motor Octane) gasoline containing 0.016% sulphur (as S) and 0.0022 g lead (as Pb, per US gallon) and was operated using a dynamometer inertia weight to represent a vehicle of 2500 lb weight. Carburation was set to give 2–2.5% carbon monoxide in the exhaust.

The catalysts were
1. as described in Example 6 in the form of 2 matrix units 4 inches in diameter and 3 inches long
2. a proprietary oxidation catalyst in the form of 3 matrix units 4 inches in diameter and 3 inches long.

The catalysts were warmed to operating temperature by temporarily feeding air to the inlet of reactor (1) at the cold start but not at the start following the 10 minute standstill. The rates of emission in grams per mile were

| | | | |
|---|---|---|---|
| Hydrocarbon | 0.16 | (Federal standard | 0.41 |
| CO | 0.72 | | 3.4 |
| $NO_x$ | 0.18 | | 0.40) |

We claim:

1. A catalyst for treating internal combustion engine exhaust gases which comprises at least one non-noble metal or compound thereof on a support that comprises a primary catalyst support carrying a refractory secondary catalyst support, the secondary support consisting essentially of one or more involatile acidic and/or amphoteric oxides selected from the group consisting of alumina, silica, chromia, manganese oxide, iron oxide and mixtures or compounds thereof substantially in combination with one or more basic oxides from the group consisting of calcium, strontium and barium wherein at least 70% by weight of said acidic and/or amphoteric oxide is in combination with said basic oxides and said one or more basic oxides is present in a quantity that will give a stoichiometric compound with said acidic and/or amphoteric compound.

2. A catalyst according to claim 1 in which the acidic oxide is an aluminosilicate.

3. A catalyst according to claim 2 in which the secondary support comprises melilite.

4. A catalyst according to claim 1 in which the secondary support has a porosity in the range 30 to 70% by volume.

5. A catalyst according to claim 1 in which the secondary support is naturally-occurring or separately made material or is the in situ reaction product of precursors thereof.

6. A catalyst according to claim 1 in which the secondary support is the in situ reaction product of added oxide with the primary support.

7. A catalyst according to claim 1 in which the primary support and the secondary support consist essentially of calcium aluminosilicate and the function of the primary support is performed by the inner regions of the support and the function of the secondary support is performed by the surface regions thereof.

8. A catalyst according to claim 1 in which the primary support is cordierite.

9. A catalyst according to claim 1 having a cordierite primary support in the form of a multi-tubular matrix having 40 to 500 passages separated by walls of thickness 0.1 to 0.4 mm and a secondary support forming a layer on the surface of the primary support, the secondary support constituting 2-40% by weight of the primary support and consisting essentially of gehlenite.

10. A catalyst according to claim 1 in which the active material of the catalyst comprises metallic nickel or cobalt or an alloy of these, the catalyst being intended for reductive treatment of exhaust gas.

11. A catalyst according to claim 10 containing also copper, silver, platinum group metal or mixtures thereof.

12. A catalyst according to claim 11 in which copper is present in a content, calculated as CuO, of 2-10% of the nickel and cobalt and nickel/cobalt alloy calculated as monoxides.

13. A catalyst according to claim 1 in which the active material of the catalyst comprises one or more oxides of nickel, cobalt, copper, manganese or chromium and, the catalyst being intended for oxidative treatment of exhaust gas.

14. A catalyst according to claim 13 in which the active material of the catalyst comprises also a platinum group metal.

15. A method of producing a catalyst of at least one non-noble metal or compound thereof on a support which comprises a primary catalyst support carrying a refractory secondary catalyst support, the secondary support consisting essentially of one or more involatile acidic and/or amphoteric oxides selected from the group consisting of alumina, silica, chromia, manganese oxide, iron oxide and mixtures or compounds thereof substantially in combination with one or more basic oxides from the group consisting of calcium, strontium and barium which comprises the step of reacting secondary support precursor compounds together at an elevated temperature of over 800°C in the presence of a compound thermally decomposable to form a highly porous solid.

16. A method according to claim 15 in which the secondary support precursor mixture is heated by means of a stream of gas in which the oxidation of hydrogen, carbon monoxide, hydrocarbons or mixtures thereof is taking place.

17. A method according to claim 15 in which the gas is the exhaust, to which air has been added, from a rich-running internal combustion engine.

18. A method according to claim 15 in which the catalytic material precursors are compounds of a non-noble metal and the mixture is subjected to reduction before the reaction at elevated temperature.

* * * * *